United States Patent [19]

Okamoto et al.

[11] Patent Number: 5,052,772
[45] Date of Patent: Oct. 1, 1991

[54] FIBER TYPE LIGHT WAVE-LENGTH CONVERTING APPARATUS

[75] Inventors: Sota Okamoto; Kiyofumi Chikuma, both of Saitama, Japan

[73] Assignee: Pioneer Electronic Corporation, Tokyo, Japan

[21] Appl. No.: 617,817

[22] Filed: Nov. 26, 1990

[30] Foreign Application Priority Data

Nov. 27, 1989 [JP] Japan .................................. 1-306977

[51] Int. Cl.[5] .............................................. G02F 1/35
[52] U.S. Cl. ..................................... 385/33; 307/430; 385/122; 359/326; 359/709
[58] Field of Search ........................... 307/425–430; 350/96.15, 96.18, 96.29, 96.30, 96.19, 432

[56] References Cited

U.S. PATENT DOCUMENTS

| | | | |
|---|---|---|---|
| 4,892,375 | 1/1990 | Chikuma et al. | 350/96.18 |
| 4,909,587 | 3/1990 | Okamoto et al. | 350/96.19 |
| 4,919,511 | 4/1990 | Ohsawa | 350/96.29 |

Primary Examiner—John D. Lee
Attorney, Agent, or Firm—Fleit, Jacobson, Cohn, Price, Holman & Stern

[57] ABSTRACT

A fiber type light wave-length converting apparatus having a fiber type light wave-length converting element and an axicon lens. The fiber type light wave-length converting element is arranged to a position relative to the axicon lens satisyfing a predetermined condition, whereby an SH wave of a parallel light having a circular intensity distribution is obtained.

1 Claim, 3 Drawing Sheets

FIBER TYPE LIGHT WAVE-LENGTH CONVERTING APPARATUS

BACKGROUND OF THE INVENTION

1. Field of the Invention

The present invention relates to a light wave-length converting apparatus of fiber type.

2. Description of Background Information

There has been known an optical pickup in which a wave-length of a laser light beam which is generated from a laser light source is converted into a half wave-length by using a light wave-length converting apparatus, thereby enabling information to be written onto and to be read out from an optical disk at a higher density (reference is directed to Japanese Patent Application Provisional Publicaton No. 61-50122).

A fiber type SHG (Second Harmonics Generator) using a secondary nonlinear optical effect has been known as a light wave-length converting apparatus. The fiber type SHG uses the phase matching of Cerenkov irradiation system. According to such a system, the second harmonic (hereinafter, abbreviated to an SH wave) is generated, to which phase matching is attained almost automatically.

In the fiber type SHG using the Cerenkov phase matching, the emerging SH wave has a ring-like intensity distribution and its equiphase surface is conical. To focus such an SH wave to a diffraction limit, as shown in FIG. 1, and optical system is generally used which comprises a combination of: an axicon lens 3 for converting an SH wave which was emitted from the primary light source 1 and wave-length converted by a fiber type SHG 2 into a parallel light; and a condenser lens 4 for focusing the parallel light derived from the axicon lens 3. On the other hand, in the case of using such an optical system as the light source of the optical pickup mentioned above, an optical system as shown in FIG. 2 is conceivable.

In FIG. 2, the parallel light from the axicon lens 3 passes through a beam splitter 5 and is transmitted through a quarter wave-length ($\lambda/4$) plate 6. Thereafter, the light is focused onto an information recording surface of an optical disk 8 by an objective lens 7 (corresponding to the condenser lens 4 in FIG. 1). The reflected light from the information recording surface passes through the objective lens 7 and the quarter wave-length plate 6. After that, the light is reflected by the beam splitter 5. The reflected light then passes through a condenser lens 9 and a cylindrical lens 10 and enters into the photo sensitive surface of a photodetector 11.

As mentioned above, in the case of the optical pickup using the fiber type SHG including the combination of the axicon lens 3 and the objective lens 7 as a light source, since the light beam has a ring-like intensity distribution, the diameter of the light beam must be adjusted so as to sufficiently satisfy conditions determined a numerical aperture (NA) of the objective lens 7. Further, if the objective lens 7 is vibrated in the direction perpendicular to the optical axis by a tracking servo operation, the ring-like light beam would be interrupted by the objective lens 7, so that a drawback will result such that the intensity distribution becomes uneven and a focused light spot is disturbed.

On the other hand, as a focused pattern which is obtained by focusing the light having the ring-like intensity distribution, a side lobe light amount increases as compared with the pattern of a light having a circular intensity distribution. Therefore, what is called a cross-talk, that is the leakage of information of adjacent pits on the information recording surface, increases and a central lobe light amount decreases, so that an actual light amount which can be used to read pit information decreases. Such a situation causes a large problem in the case where an efficiency of the SHG itself is relatively low.

The above drawbacks are originated from the fact that the light of the light source has a ring-like intensity distribution.

OBJECT AND SUMMARY OF THE INVENTION

It is, therefore, an object of the invention to provide a fiber type light wave-length converting apparatus which can obtain an SH wave of a parallel light having a circular intensity distribution.

A fiber type light wave-length converting apparatus according to the invention comprises: a fiber type SHG for converting the wave-length of an incident light; an axicon lens for converting the light emitted from the SHG into the parallel light; and a condenser lens for focusing the parallel light from the axicon lens, wherein the axicon lens is arranged at a position which satisfies the condition of $$L = D/2\tan\alpha$$

for the SHG when it is assumed that a distance from the emitting end surface of the SHG to the front end of the axicon lens is expressed by L and an outer diameter of the SHG is set to D and a Cerenkov angle is expressed by $\alpha$.

In the fiber type light wave-length converting apparatus according to the invention, as SH wave of the parallel light having a circular intensity distribution is obtained by the positional relation which satisfies the above condition of the axicon lens for the SHG.

DETAILED DESCRIPTION OF THE PREFERRED EMBODIMENTS

An embodiment of the invention will be described in detail hereinafter with reference to FIG. 3.

Figure 1:
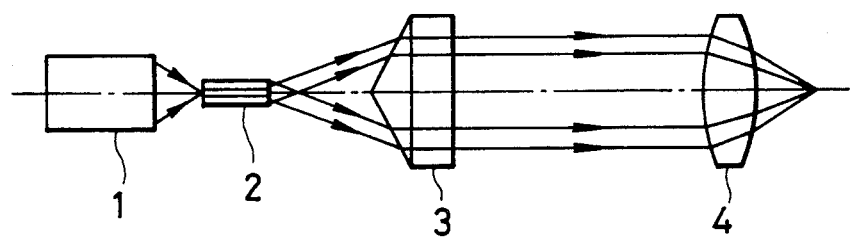
FIG. 1 is a diagram showing an example of a conventional light wave-length converting apparatus.
Figure 2:
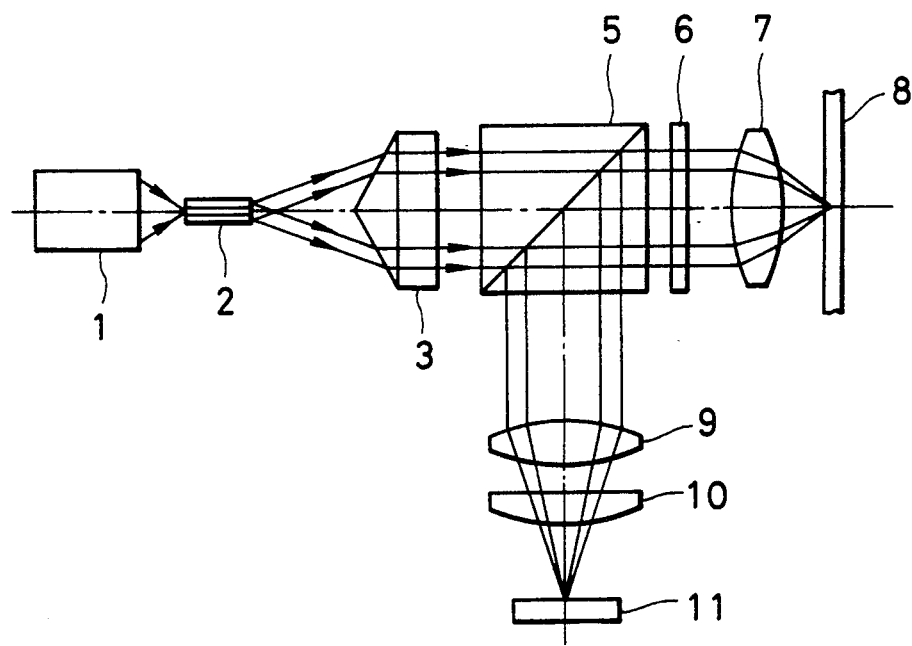
FIG. 2 is a diagram showing the construction of an optical system of an optical pickup using the apparatus of FIG. 1 as a light source.

A fiber type light wave-length converting apparatus according to the invention comprises the primary light source 1, fiber type SHG 2, axicon lens 3, and condenser lens 4 in a manner similar to the conventional apparatus shown in FIG. 1. However, in the fiber type light wave-length converting apparatus according to the invention, as will be obviously understood from FIG. 3 showing an enlarged diagram of the main section of the apparatus, the axicon lens 3 is arranged at a position which satisfies the condition of $$L = D/2\tan\alpha$$

for the SHG 2 when it is assumed that a distance from the emitting edge surface of the SHG 2 to the front edge of the axicon lens 3 and an outer diameter of the SHG 2 are expressed by L and D respectively, and a Cerenkov angle (SH wave emitting angle) is expressed by $\alpha$.

Figure 4:
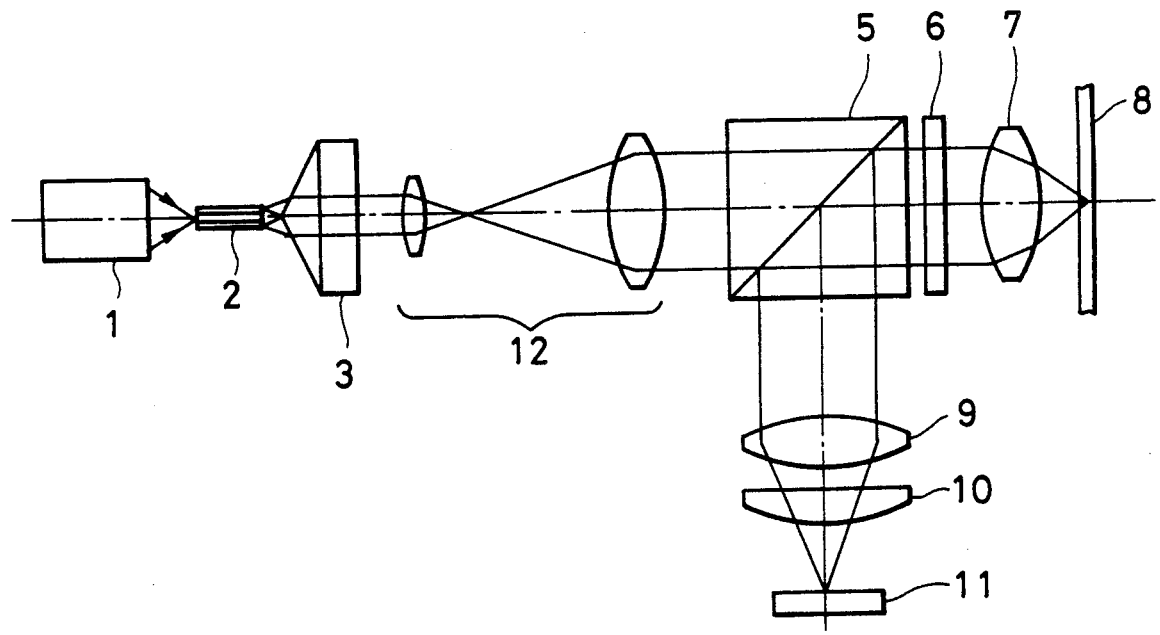
FIG. 4 is a diagram showing the construction of an optical system of an optical pickup using the apparatus of FIG. 3 as a light source.

According to the above construction, since an SH wave of a parallel light having a circular intensity distribution is obtained, the SH wave can be utilized efficiently. Therefore, if the fiber type light wave-length converting apparatus of the invention is used as a light source of an optical pickup, as shown in FIG. 4, the optical pickup can be constructed in a manner similar to the conventional optical system. In FIG. 4, the SH wave emitted from the axicon lens 3 is expanded by a beam expander optical system 12 and, thereafter, it enters the beam splitter 5.

Figure 3:
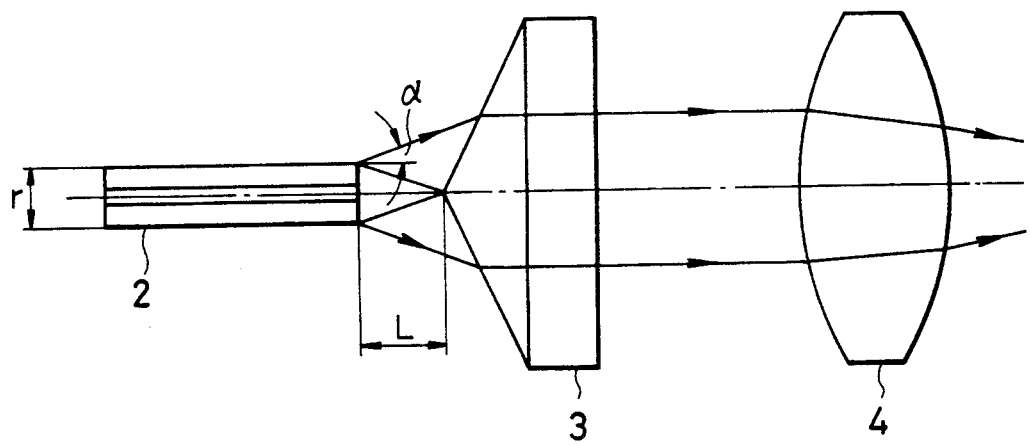
FIG. 3 is a diagram showing the construction of an embodiment of the invention.
Figure 5:
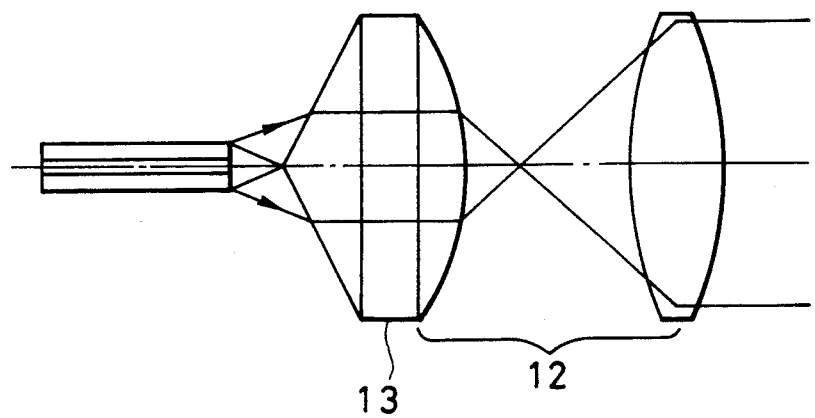
FIGS. 5 to 7 are diagrams showing the construction of other embodiments of the invention.
Figure 6:
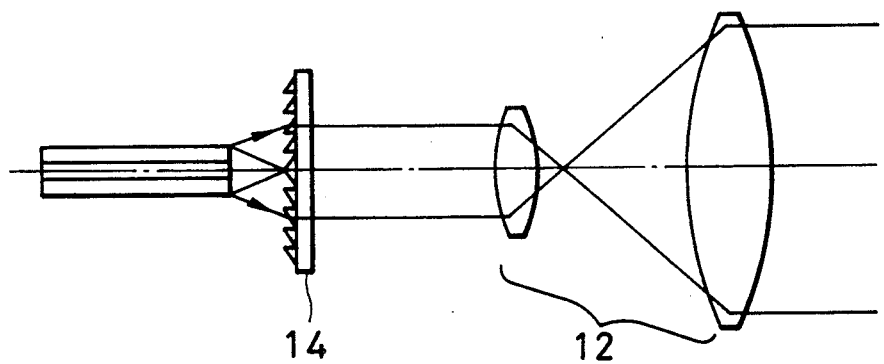
Figure 7:
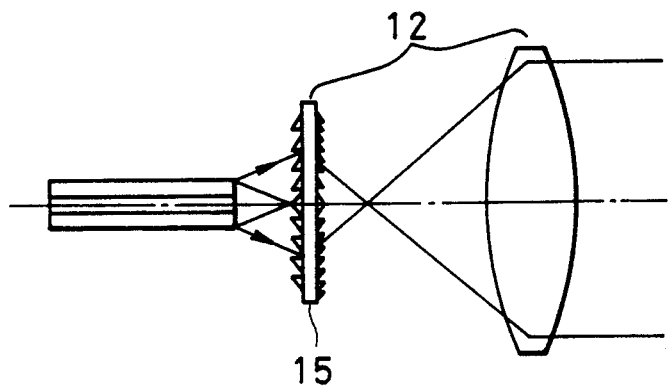

The axicon lens for converting the SH wave emitted from the SHG 2 into the parallel light is not limited to the construction of FIG. 3 but can be also constructed as shown in FIG. 5, 6, or 7. That is, there is a construction using a condenser lens compound type axicon lens 13 (FIG. 5) in which an axicon lens and a condenser lens on the incident side of a beam expander are constructed to an integrated form. There is a construction using a Fresnel type axicon lens 14 (FIG. 6). There is also a construction using a compound lens 15 (FIG. 7) in which an axicon lens and a condenser lens on the incident side of a beam expander are constructed into an integrated form and one surface is formed as a Fresnel type axicon lens and the other surface is formed as a Fresnel type condenser lens. In brief, it is sufficient to use an axicon lens having a structure which can convert the SH wave emitted from the SHG 2 into the parallel light or a structure which can convert the SH wave into the parallel light and can focus the parallel light after the conversion.

As described above, in the fiber type light wave-length converting apparatus according to the invention, since the axicon lens is arranged at a position which satisfies the condition of $$L = D/2\tan\alpha$$

for the SHG, the SH wave of the parallel light having a circular intensity distribution can be obtained. Therefore, such a fiber type light wave-length converting apparatus can be used as a light source of the optical pickup.

What is claimed is:

1. A light wave-length converting apparatus comprising:
    a fiber type light wave-length converting element for converting a wave-length of an incident light;
    an axicon lens for converting a light emitted from the light wave-length converting element into a parallel light; and
    a condenser lens for focusing the parallel light from the axicon lens, wherein the axicon lens is arranged at a position which satisfies a condition of $$L = D/2\tan\alpha$$

for the light wave-length converting element where L represents a distance from an emitting end surface of the light wave-length converting element to a front edge of the axicon lens, D represents an outer diameter of the light wave-length converting element, and $\alpha$ represents Cerenkov angle.

* * * * *